US005586479A

United States Patent [19]

Roy et al.

[11] Patent Number: 5,586,479

[45] Date of Patent: Dec. 24, 1996

[54] CUTTING APPARATUS FOR CUTTING AN IMAGE FROM A RECEIVING SHEET

[75] Inventors: Carl W. Roy, Spencerport; Paul E. Tschiderer, Geneseo, both of N.Y.

[73] Assignee: Eastman Kodak Company, Rochester, N.Y.

[21] Appl. No.: 29,257

[22] Filed: Mar. 10, 1993

[51] Int. Cl.[6] .......... B23Q 15/26; B26D 5/20; B26D 5/38; G01D 15/00

[52] U.S. Cl. .......... 83/74; 83/368; 83/371; 83/404.1; 83/419; 346/24

[58] Field of Search .......... 346/24; 354/221; 355/310, 317, 29; 83/33, 74, 75, 367, 368, 419, 72, 371, 404.1

[56] References Cited

U.S. PATENT DOCUMENTS

| | | | |
|---|---|---|---|
| 3,806,241 | 4/1974 | Gregg et al. | 355/13 |
| 4,054,284 | 10/1977 | Kupisiewicz | 271/167 X |
| 4,463,677 | 8/1984 | Kuehfuss | 101/426 |
| 4,971,304 | 11/1990 | Lofthus | 271/227 |
| 4,974,016 | 11/1990 | Fleckenstein et al. | 355/29 |
| 4,984,029 | 1/1991 | Nishikawa | 355/310 |
| 5,007,317 | 4/1991 | Jenkner | 83/404.1 |
| 5,040,026 | 8/1991 | Jamzadeh et al. | 355/271 |
| 5,079,981 | 1/1992 | Singer et al. | 83/72 |
| 5,151,717 | 9/1992 | Jamzadeh et al. | 346/157 |
| 5,187,753 | 2/1993 | Bloomberg et al. | 382/46 |

OTHER PUBLICATIONS

*Standard Handbook For Electrical Engineers*, McGraw-Hill, Inc., 1968, section 1-5.

*Primary Examiner*—Benjamin R. Fuller
*Assistant Examiner*—David Yockey
*Attorney, Agent, or Firm*—Leonard W. Treash

[57] ABSTRACT

The present invention relates to a cutting apparatus which includes a cutter. A pair of sensors is used to detect a lead edge of an image located on a receiver sheet. In response to the sensors the cutter and the lead edge of the image are aligned. The receiving sheet is transported in a direction essentially perpendicular to the cutter. The cutter cuts the receiving sheet adjacent and parallel to the lead and trail edges of the image. A cut lead edge of the receiving sheet is edge registered. A third sensor detects edges of the image perpendicular to the cut lead edge of the image. A second cutter, responsive to the third sensor, cuts the receiving sheet adjacent edges of the image perpendicular to the cut lead edge of the image.

4 Claims, 4 Drawing Sheets

CUTTING APPARATUS FOR CUTTING AN IMAGE FROM A RECEIVING SHEET

TECHNICAL FIELD

This invention relates to image reproduction and, more particularly, to cutting apparatus for cutting an image, which may be skewed relative to a receiving sheet on which the image is located, from the receiving sheet.

BACKGROUND ART

U.S. Pat. No. 5,151,717, which issued in the name of Jamzadeh et al. on Sep. 29, 1992, discloses an electrostatographic image reproduction system. This system allows a variety of sizes of prints to be made utilizing a single large receiving sheet. The receiving sheet is large enough to receive one image of the largest size or an array of smaller sized images. A receiving sheet with smaller images is cut to size after image transfer.

A problem occurs if the images on the receiving sheet are askew relative to the edges of the receiving sheet. The problem is that if there are to be no borders in the finished image the cutter will cut off part of the skewed image and also leave a border on part of the edges of the image. If the finished image is to have borders, these borders will not be of uniform width. This results in degraded image quality because the edges of the image are not parallel with the respective edges of the receiver sheet on which the image is located.

DISCLOSURE OF THE INVENTION

It was the inventors' discovery that the source of the problem was the fact that the cutter was oriented relative to an edge of the receiver sheet rather than to an edge of the image. Typically, a receiving sheet to be cut will be aligned against an edge guide as it is transported to the cutter. The cutter is oriented relative to this edge guide and therefore will make cuts relative to the aligned edge of the receiving sheet rather than to the image edge.

It is therefore an object of the invention, to provide cutting apparatus which can cut an image, which is askew on a receiving sheet, from the receiver sheet to yield a finished image which is properly oriented relative to the edges of the remaining receiving sheet.

The present invention relates to a cutting apparatus which includes a cutter. A sensor is used to detect an edge of an image located on a receiver sheet. The cutter and the edge of the image are aligned in response to the sensor.

An advantage of the present invention is that even if an image is created on a receiving sheet in a skewed orientation, the receiving sheet can be cut such that the edges of the image are perpendicular to the respective edges of the receiving sheet.

BRIEF DESCRIPTION OF THE DRAWINGS

In the detailed description of the preferred embodiment of the invention presented below, reference is made to the accompanying drawings, in which.

BEST MODE OF CARRYING OUT THE INVENTION

Figure 1:
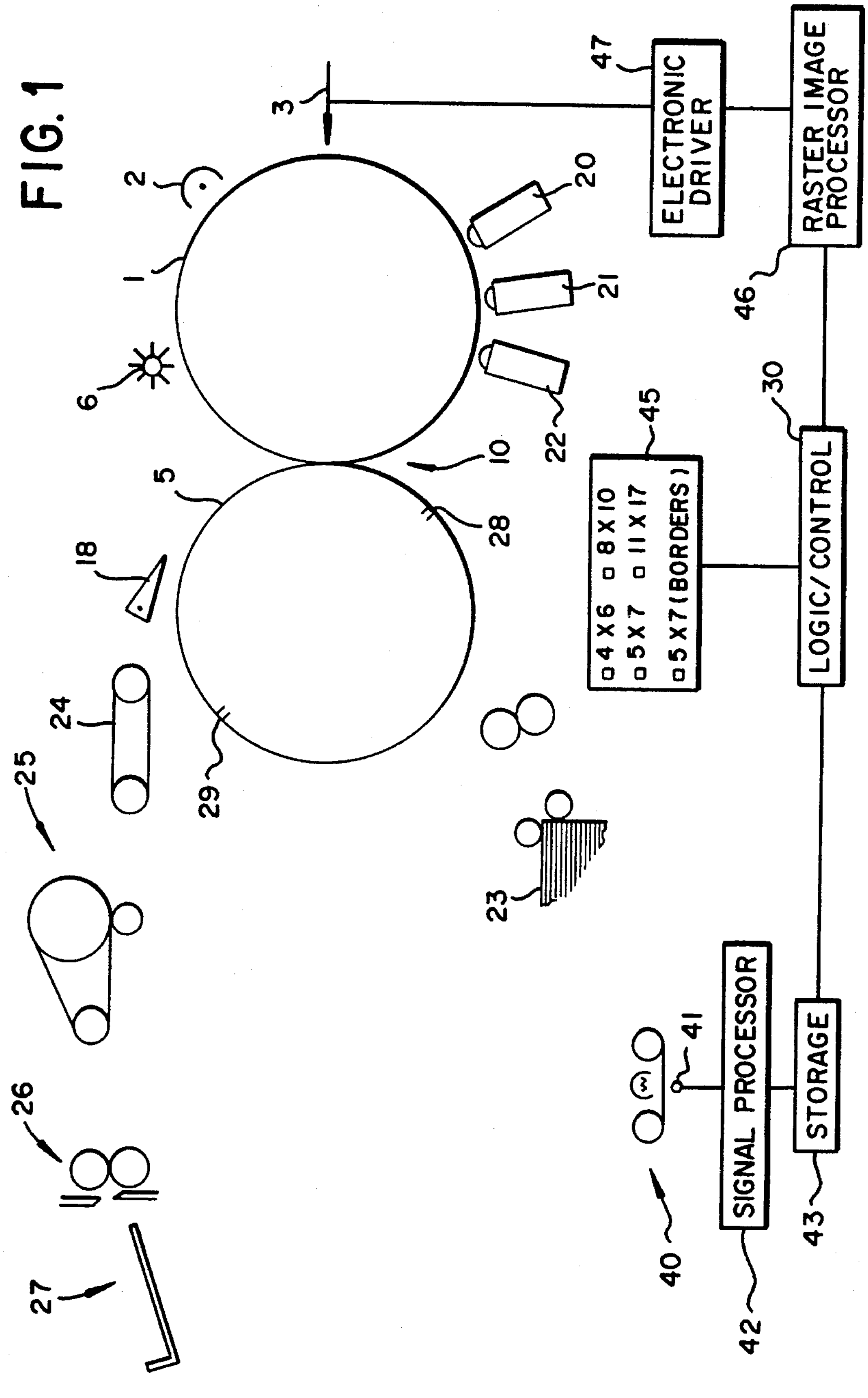
FIG. 1 is a side schematic of a multicolor image forming apparatus.

FIG. 1 illustrates a multicolor image forming apparatus utilizing electrophotography. Most of it is conventional. An image member, for example, a photoconductive drum 1, is rotated by a motor, not shown, past a series of electrophotographic stations, all well-known in the art. A charging station 2 uniformly charges the surface of the drum 1. The uniformly charged surface is exposed at an exposure station, for example, laser exposure station 3, to create a series of electrostatic images, each representing a color separation of a multicolor image to be formed. The series of electrostatic images are toned by different color toner stations 20, 21 and 22, one different color for each image, to create a series of different color toner images. The images are then transferred in registration to a receiving sheet carried on the periphery of a transfer roller or drum 5. The drum 1 is cleaned by cleaning station 6 and reused.

The receiving sheet is fed from a receiving sheet supply 23 into a nip 10 between drum 1 and drum 5. As it approaches nip 10 it is secured to drum 5 by a vacuum means, gripping fingers or other mechanism. For example, the leading end of the sheet can be secured by a row of vacuum holes 28 and the trailing end by a row of vacuum holes 29.

After all 3 (or 4) color separation toner images have been transferred to the surface of the receiving sheet, the leading edge of the receiving sheet is stripped from roller 5 by stripping mechanism 18. The receiving sheet is pushed by further rotation of roller 5 onto a sheet transport 24 which carries it to a fixing device 25 and then to a cutting apparatus 26. After the sheet has been cut by the cutting apparatus the resulting prints are collected in a tray 27 or more sophisticated print collecting device.

The input for exposure station 3 begins with a color scanner 40 which includes a color responsive CCD 41 for scanning an original to be printed, for example, 35 mm color negative film. The output from CCD 41 is fed to a signal processor 42 which converts the CCD signal into a form suitable for storing in memory. For example, signal processor 42 can use suitable compression algorithms to save in storage, enhance the image in both its color aspects and its resolution including color masking, halftone screening, etc. all processes well known in the art. After such signal processing, the image information is stored in a suitable storage 43. Because this system demands substantial storage, a preferred form of storage is a system using magnetic disks.

A logic and control 30 is capable of accessing the storage 43 and also receives inputs from various portions of the machine including encoders (not shown) on drum 1 and roller 5, cutter 26 and various stations to manage the timing of the entire apparatus. One of the inputs to logic and control 30 is a print size designation portion 45 of an operator control panel. As shown in FIG. 1, the operator can press a button beside any of four print sizes ranging from 4×6 through 5×7, 8×10, 11×17 and also 5×7 with borders. The logic and control 30 then receives the input from the print size designation portion 45 and the memory 43 and supplies that information in an appropriate form to raster image processor 46 which lays out the bit map for the ultimate exposure. The output from the raster image processor 46 is fed to an electronic driver 47 for electronic exposure station 3 to control the intensity of a laser, LED printhead, or the like, making up that station.

Prior electrophotographic color apparatus capable of providing a variety of sizes of sheets has a sheet supply 23 which can be loaded with different sizes of sheets and a transfer drum 5 which is capable of holding different size sheets. These devices have specific complexities that are undesirable in such apparatus including flexibility in the sheet supply and other portions of the paper path. For example, adjustments for size must be made in the sheet supply or different size cartridges used. The distance between stations and between feed rollers must accommodate the different sizes. However, the most serious problems arise in securing the sheets to transfer roller 5. If both the leading and trailing edges of the sheet are to be held by a vacuum means 28 and 29 as shown in FIG. 1, those vacuum means must be separated by different lengths of the drum periphery for different size sheets. The drum being capable of taking a larger size, small prints will be produced at the same slow rate that larger prints are produced. More significantly, image quality in the large sheets will suffer from the vacuum holes that are necessarily under their image areas.

To solve this problem, the apparatus as shown in FIG. 1 is capable of taking a single large size sheet, for example, 13 inches by 19 inches. Only 2 sets of vacuum holes are provided and the entire apparatus is optimized for productivity for the single size sheet. The sizes are chosen to allow later cutting for the print size produced. According to FIG. 2 a 13 inch by 19 inch receiving sheet 75 can hold nine 4×6 images. Although vacuum holes 28 and 29 will in fact be under the very leading and trailing edges of the receiving sheet 75, they can be limited to the leading and trailing one quarter inch where such defects are least likely to be noticed. Alternatively, a narrow leading and trailing margin can be provided and later trimmed.

The same advantages of the FIG. 1 apparatus for color imaging, i.e., advantages associated with ease in receiving sheet handling, would also be true for a single color apparatus. For example, even an ordinary, black only, electrophotographic copier would find some simplification in its apparatus if it handled only a single-size receiving sheet. The commercial attractiveness of such an embodiment would depend, of course, upon the expense of the cutting operation compared to the simplification of the sheet handling path.

The process illustrated in FIG. 1 can be capable of extremely high-quality imaging. The quality of that imaging is dependent on many portions of the process. In particular, it is dependent on the resolution of the exposure device 3, the size of the toners used to create the toner images and the registration associated with the exposure and transfer stations. To compete with ordinary photography in making prints, extremely fine toners are necessary. It is presently possible to tone images with toners as small as 3.5 microns and smaller which toners provide extremely high-quality images if correctly registered.

Transfer of extremely fine toners is difficult to do electrostatically. Better results are obtained by a combination of heat and pressure. If substantial pressures are used in the transfer process, for example, pressures in excess of forty pounds per square inch, and both the transfer roller and the image drum are independently driven, excessive wear will result to the surfaces in contact, which wear is especially damaging to the photoconductive surface of the imaging drum. U.S. Pat. No. 5,040,056 to Jamzadeh et al, MULTICOLOR IMAGE FORMING APPARATUS, issued Aug. 13, 1991, deals with problems associated with maintaining registration in a system in which the transfer roller is driven by an imaging member such as photoconductive drum 1. According to that application, to maintain extremely precise registration for full utilization of extremely fine toner particles and high quality exposure, the transfer roller is separated from the image member and reindexed for every revolution of the transfer roller. This particular approach provides extremely precise registration of the transfer roller 5.

With the quality of stepper motor and sensors presently available, registration of a higher quality can be maintained between images than if the drum 1 is allowed to rotate the roller 5 through the entire cycle.

It is common in many color copiers using a drum photoconductor to provide a substantial fly wheel driven with the drum to even out the rotation of the drum to avoid image defects. Defects that are repeated in all colors in the same way are less objectionable than a defect that occurs only in one color and not in others. The latter defect may show up as a shift in color and be quite noticeable. For that reason, it is common to have both the drum and transfer roller of the same size and form one image for each revolution of each. Thus, any variations in the periphery of the drum or transfer roller or variations that occur repeatedly in the motion of either will be repeated with each image and not show as a misregistration of colors.

Figure 2:
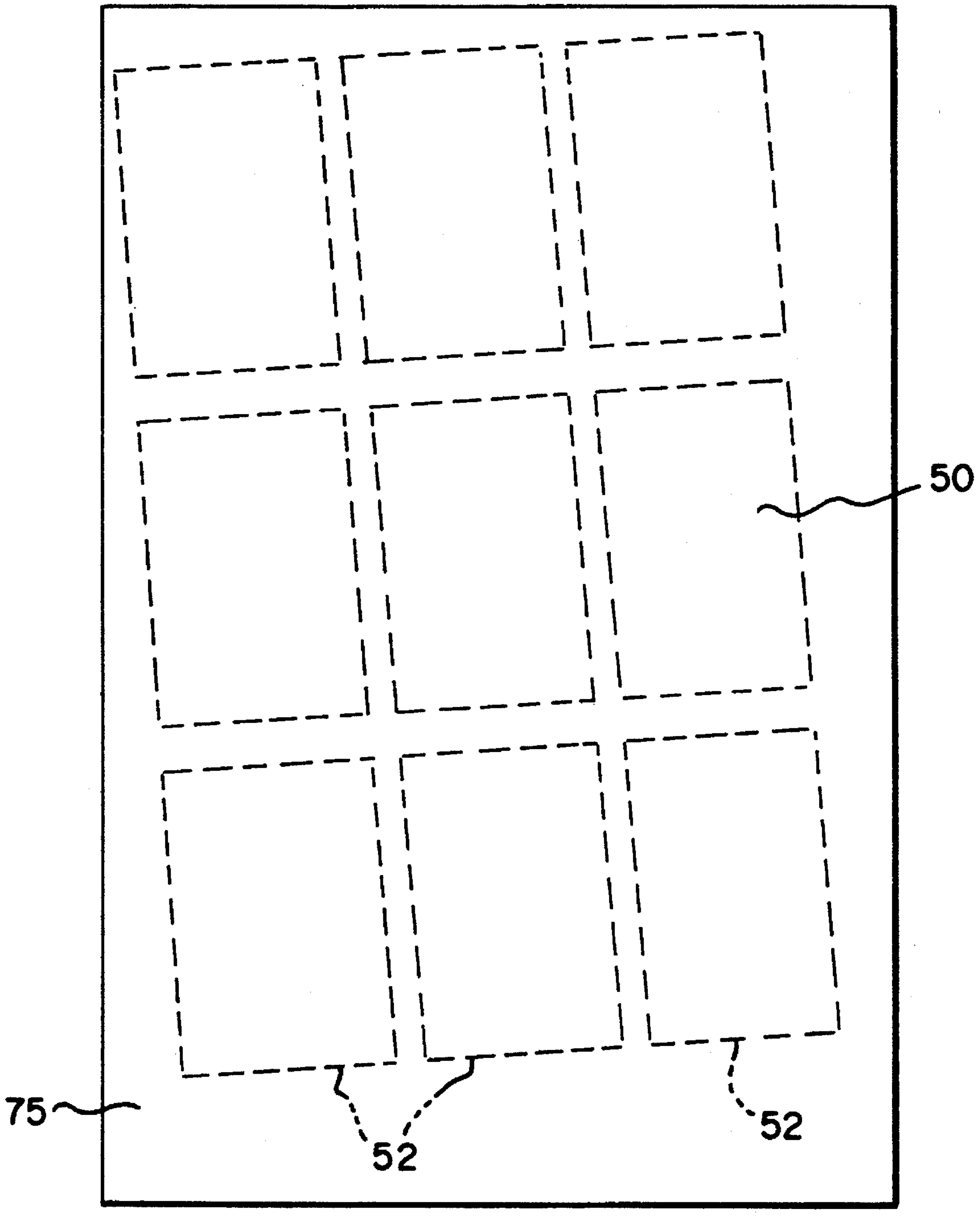
FIG. 2 is a top view illustrating a receiving sheet having multiple images thereon prior to cutting.

Referring to FIG. 2, receiving sheet 75 contains nine 4"×6" images 50. Each image has a lead edge 52. In FIG. 2 images 50 are skewed relative to receiving sheet 75. In other words, the edges of the images are not parallel with the respective edges of the receiving sheet. If a conventional cutter is used to excise the images from the receiving sheet, the edges of the excised images will not be parallel with the respective edges of the receiving sheet.

Figure 3:
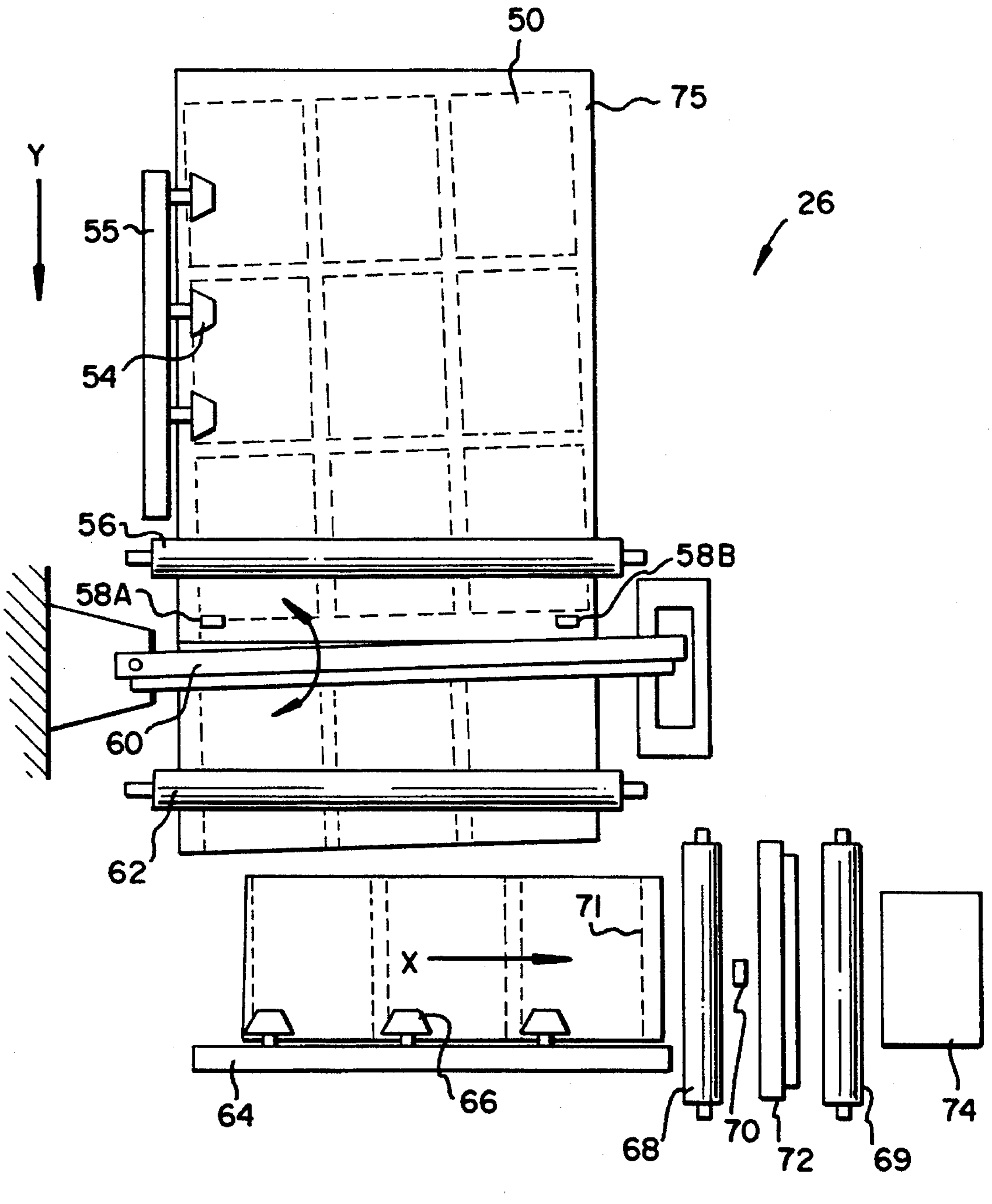
FIG. 3 is a top view of a cutting apparatus.

To solve this problem, the present invention provides cutting apparatus 26 which is shown in greater detail in FIG. 3. Receiving sheet 75 is transported in a direction Y by rollers 54 and 56. The receiving sheet is edge registered against member 55 by rollers 54.

A sensor device including sensors 58A and 58B determines an amount of skew of the images by detecting the lead edge of the images. The sensors output is inputted to logic/control. 30 Sensors 58A and 58B each include a light source, such as a light emitting diode (LED), and a pair of photoelectric devices, such as photodiodes. The LED and a first photodiode are located above a plane in which receiver sheet 75 travels while the second photodiode is located below this plane. Before a receiver sheet reaches sensors 58A and 58B, light from the LED is not blocked by the receiver sheet. This light is sensed by the second photodiode. When a receiver sheet reaches the sensors, light from the LED is cut off from the second photodiode. The light now bounces off the receiver sheet and is sensed by the first photodiode. This indicates to logic/control 30 that a receiver sheet has reached the sensors.

Assuming the receiver sheet is white, the amount of light reaching the first photodiode will be constant until the lead edge of the image reaches the sensor. Once the lead edge of the image reaches the sensor, assuming there is pigmented toner at the lead edge of the image, there will be a discontinuity in the amount of light which reaches the first photodiode. This indicates to logic/control 30 that the lead edge of the image has been detected.

A problem will occur if there is no pigmented toner at the lead edge of the image where the sensors look for the lead edge. The lead edge will not be detected in this case. One method of solving this problem is to create a small dark mark just ahead of the lead edge of the image. This mark can be created by logic/control 30 causing raster image processor to add several extra lines of data to the bit map just ahead of the lead edge of the image. The mark must be located such that when the lead edge of the image is cut the mark will not remain in the image. This mark will be detected whether or not there is pigmented toner at the lead edge of the image. Another solution is to apply clear toner when creating the image to any areas not having pigmented toner. The clear toner, when fused, will have a much higher reflectance than a typical receiver sheet which does not have clear toner on it. This change in reflectance is used to detect the lead edge of an image when there is no pigmented toner at the lead edge.

Assuming receiving sheet 75 is moving at a velocity of Y' in the Y direction, an amount of skew can be determined as follows. The time difference between when sensor 58A detects an image's lead edge and when sensor 58B detects an image's lead edge is determined by logic/control 30. This time difference is then multiplied by velocity Y' to obtain a skew distance. The skew distance is then divided by the distance between sensors 58A and 58B to obtain a skew ratio. By determining the inverse tangent of the skew ratio a skew angle is determined. The determination of the skew angle is accomplished by logic/control 30. The skew angle represents the angle that cutter 60 is moved in order to align the cutter with the lead edges of the images.

Cutter 60 is rotated to the skew angle while receiving sheet 75 is being transported at velocity Y'. Logic/control 30 determines when to actuate the cutter as follows. Logic/control 30 has stored in memory the distance between the sensors and the cutter when the cutter is not rotated at all. Logic/control 30 determines the distance between sensor 58A and the cutter after the cutter has been rotated. This distance is divided by the velocity of the receiver sheet to obtain a cut time $T_{ct}$. If sensor 58A detected the lead edge of the image at a time $T_0$ then logic/control 30 actuates the cutter at a time $T_0+T_{ct}$.

If a border around the images is desired cutter 60 is actuated prior to the lead edge being under the cutter. This is controlled by logic/control 30. After the cut is made the cut receiving sheet is further transported in the Y direction by roller 56 and a roller 62 which are preferably coupled. Cutter 60 is then actuated to cut the trail edge of the images. The trail edge cut is timed according to the velocity of the receiving sheet and the Y dimension of the image. The lead edge of the cut receiving sheet is edge registered against a member 64 and the cut receiving sheet is transported in a direction X by rollers 66, 68 and 69. The lead edge of the receiving sheet is now parallel with the lead edges of the images. A sensor 70 detects a new lead edge 71 of an image allowing a cutter 72 to actuate when lead edge 71 is under cutter 72. Cutter 72 is perpendicular to member 64 and therefore will not need to have its position adjusted, as with cutter 60, in order to be aligned with lead edge 71. Sensor 70 then detects the trail edge of the image and cutter 72 makes a cut on the trail edge. The result is finished image 74 which has image edges which are parallel with receiving sheet edges.

Figure 4:
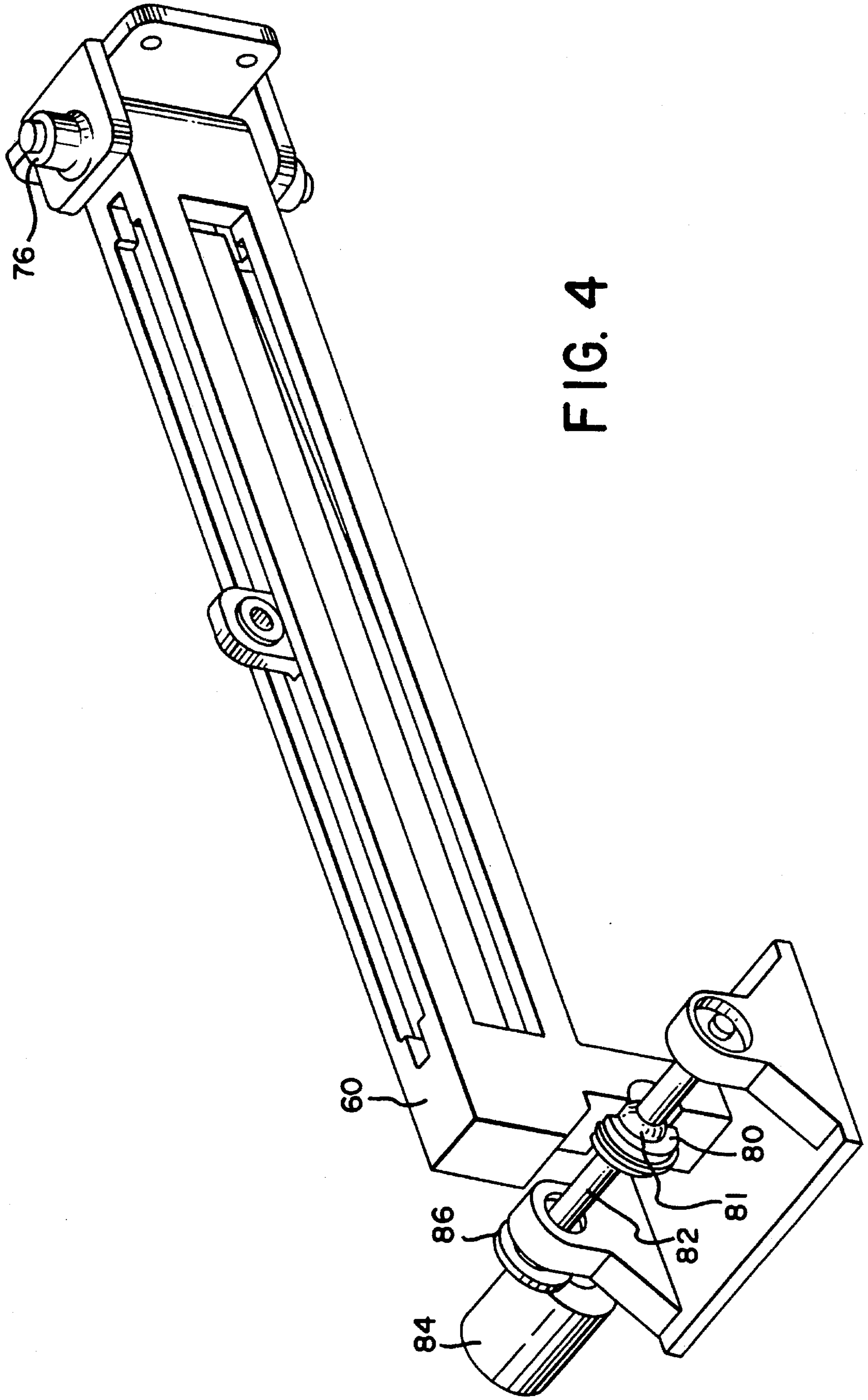
FIG. 4 is a perspective view of a cutter used in the cutting apparatus of FIG. 3.

FIG. 4 represents a more detailed embodiment of cutter 60. Cutter 60 is connected at one end to a pivot 76. Cutter 60 can rotate about pivot 76. A spherical nut 80 is secured to cutter 60. Threaded ball 81 of spherical nut 80 pivots in three dimensions within the spherical nut and engages a screw 82 which is journaled in bearings at both ends. One end of the screw is connected to a motor 84 through gearing 86. When motor 84 is operated so as to rotate screw 82, cutter 60 will be caused to rotate about pivot 76. Logic/control 30 controls the operation of motor 84 to position cutter 60 at the angle needed to align the cutter with the lead edge of an image.

In another embodiment of the invention cutter 60 is not rotated and remains stationary. Cutter 60 is oriented essentially perpendicular to the direction of travel of receiver sheet 75. In this embodiment, the receiver sheet is rotated by the skew angle to align the lead edge of the image and the cutter. Details of inducing a known skew in a receiver sheet are provided in U.S. Pat. No. 4,971,304 which issued on Nov. 20, 1990 in the name of Lofthus and which is incorporated herein by reference.

The invention has been described in detail with particular reference to a preferred embodiment thereof, but it will be understood that variations and modifications can be effected within the spirit and scope of the invention as described hereinabove and as defined in the appended claims.

We claim:

1. Cutting apparatus capable of cutting a rectangular image, skewed relative to a receiver sheet on which the image is located, from the receiver sheet such that edges of the image are essentially parallel with respective edges of the receiver sheet, comprising:

- a first cutter;
- a sensor device for detecting an edge of an image located on a receiving sheet;
- means, responsive to said sensor device, for aligning said first cutter and said edge of said image such that said first cutter can cut said receiver sheet essentially parallel to said edge of said image;
- means for edge registering an edge of the receiving sheet cut by said first cutter; and
- a second cutter positioned to cut said receiving sheet perpendicular with said edge cut by said first cutter.

2. The cutting apparatus of claim 1, wherein the means for edge registering includes an edge member, and said cutting apparatus includes:

- means for transporting said receiving sheet in a first direction to position said receiving sheet for cutting by said first cutter and then to position the edge cut by the first cutter against the edge member to perform said edge registering; and
- means for transporting said sheet in a second direction perpendicular to the first direction to slide the edge cut by the first cutter along the edge member and the sheet into an operative position for said cutting by the second cutter.

3. The cutter apparatus of claim 1, wherein said aligning means includes means for rotating said cutting.

4. The cutting apparatus of claim 1, wherein said aligning means includes means for rotating the receiver sheet.

* * * * *

UNITED STATES PATENT AND TRADEMARK OFFICE

CERTIFICATE OF CORRECTION

PATENT NO. : 5,586,479

DATED : December 24, 1996

INVENTOR(S) : Carl W. Roy et al

It is certified that errors appear in the above-identified patent and that said Letters Patent is hereby corrected as shown below:

Col 6, line 59, "cutter" should read --cutting--

Col 6, line 60, "cutting" should read --first cutter--

Signed and Sealed this

Eleventh Day of November, 1997

Attest:

Bruce Lehman

BRUCE LEHMAN

*Attesting Officer* *Commissioner of Patents and Trademarks*